April 26, 1927.
C. R. WHITACRE
1,625,837
NONRETURN CHECK VALVE FOR BRAKE SYSTEMS CONNECTING A PLURALITY OF ENGINES
Filed May 3, 1926        3 Sheets-Sheet 1
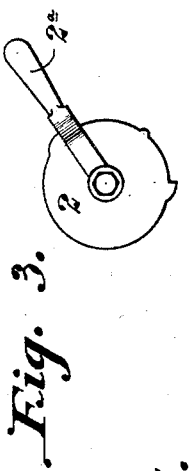
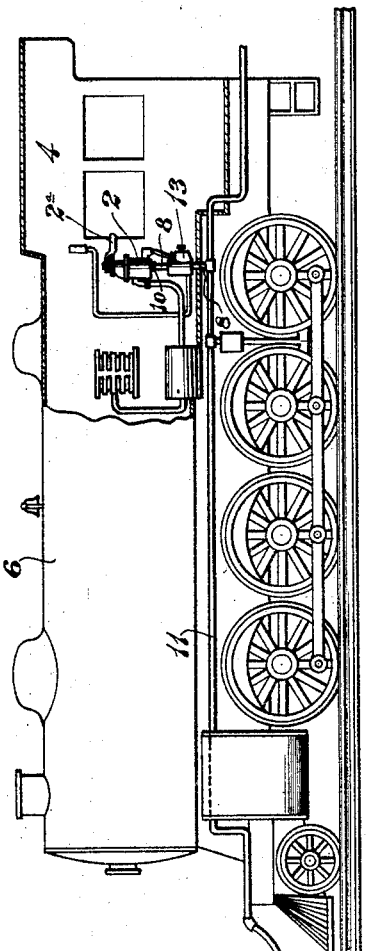
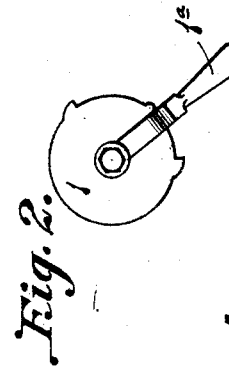
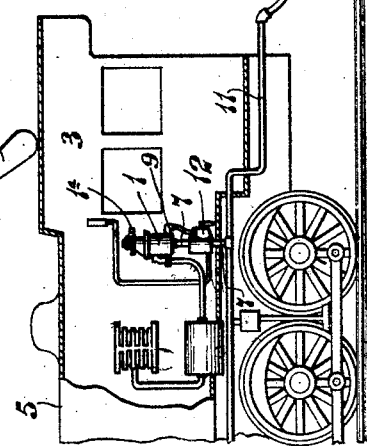
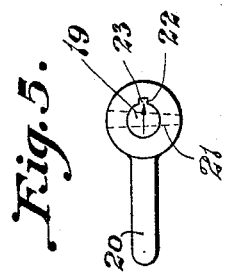
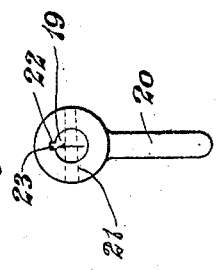
INVENTOR
C. Raymond Whitacre
BY
ATTORNEY.

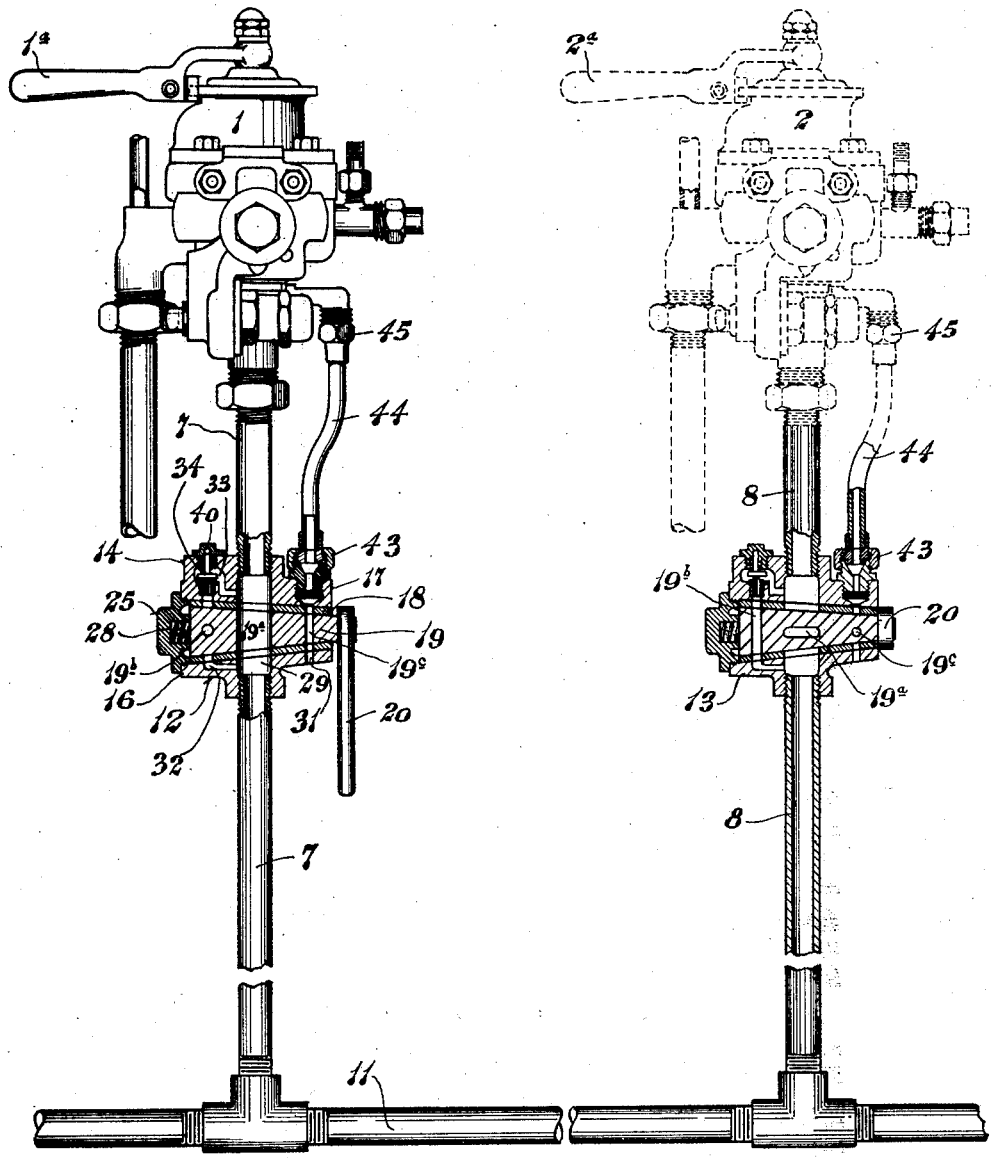

April 26, 1927. 1,625,837
C. R. WHITACRE
NONRETURN CHECK VALVE FOR BRAKE SYSTEMS CONNECTING A PLURALITY OF ENGINES
Filed May 3, 1926 3 Sheets-Sheet 3

INVENTOR.
C. Raymond Whitacre
BY
ATTORNEY.

Patented Apr. 26, 1927.

1,625,837

UNITED STATES PATENT OFFICE.

CHARLES RAYMOND WHITACRE, OF CINCINNATI, OHIO.

NONRETURN CHECK VALVE FOR BRAKE SYSTEMS CONNECTING A PLURALITY OF ENGINES.

Application filed May 3, 1926. Serial No. 106,400.

My invention relates to such check-valves for use on locomotives where two or more locomotives are coupled up in the same train, whether said locomotives are coupled together or one at the front and one at the rear of the train, or otherwise.

The object of my invention is to give any or all of the engine-men instant access to control the setting of the brakes on the entire train for the purpose of stopping it in case of an accident or other emergency.

Another object of my invention is to dispense with the necessity of cutting in the stop-cock, which is located in an inconvenient position, and to provide easily accessible means for instantly applying the brakes in case of any accident requiring the stopping of the train by any engine-man.

In the present system of railway practice where two or more engines are coupled in a train, when any trouble arises in any locomotive, except the head locomotive, so that it becomes necessary for any of the enginemen, except the head engine-man, to apply the emergency brakes, it is first necessary for such engine-man to apply the automatic brake-valve in emergency position and then reach down to a very low and inconvenient position to turn the stop-cock to open position. This requires considerable time, during which the train might advance to a dangerous point, such as running off of the derailer, or in case of a broken rod on the second or other locomotive, or in case of a burst flue in any engine, which would instantly blow the fire out of the box, so that there would not be time for the engine-man on such engine to make these adjustments and then make his escape, or in case of an accident to the train discovered by any engine-man, he can immediately apply the brakes by placing the brake-valve in emergency position, without having to next reach down to an inconvenient position to open the stop-cock in the train line.

The present system requires too much time to apply the brakes and avoid a possible accident.

My invention consists in providing, in combination with the usual stop-cock, a nonreturn by-pass or check-valve located in the brake pipe between the automatic brake-valve and the main brake pipe.

My invention further consists in the construction, combination, location and arrangement of parts and in the details of construction, as herein set forth and claimed.

In the drawings:

Fig. 1 is a side elevation partly in vertical section showing the automatic-air-brake-system coupling two engines, the brake-valve on the first engine being set for running position, while the brake-valve on the second engine is shown in the emergency position;

Fig. 2 is an enlarged plan view, showing the top of the automatic-brake-valve and the position of the brake-valve-handle when the valve is set in running position;

Fig. 3 is a view similar to Fig. 2 showing the position of the brake-valve handle when the automatic-brake valve is set in emergency position;

Fig. 4 is a view in elevation showing the position of the non-return check-valve-handle when said valve is set in open position, as indicated on the head-engine in Fig. 1;

Fig. 5 is a view similar to Fig. 4 when said valve is set in closed position, as indicated on the second-engine in Fig. 1;

Fig. 6 is a side elevation showing the non-return check-valve in vertical section and in open or service position, with the non-return by-pass thereof in closed position, and its relation to the automatic-brake-valve and brake-pipe, the latter of which is broken for lack of space;

Fig. 7 is a view similar to Fig. 6, except that the automatic-brake-valve is shown in dotted lines and the non-return-check-valve is shown in closed position, while the non-return by-pass is shown in open position;

Figure 8:
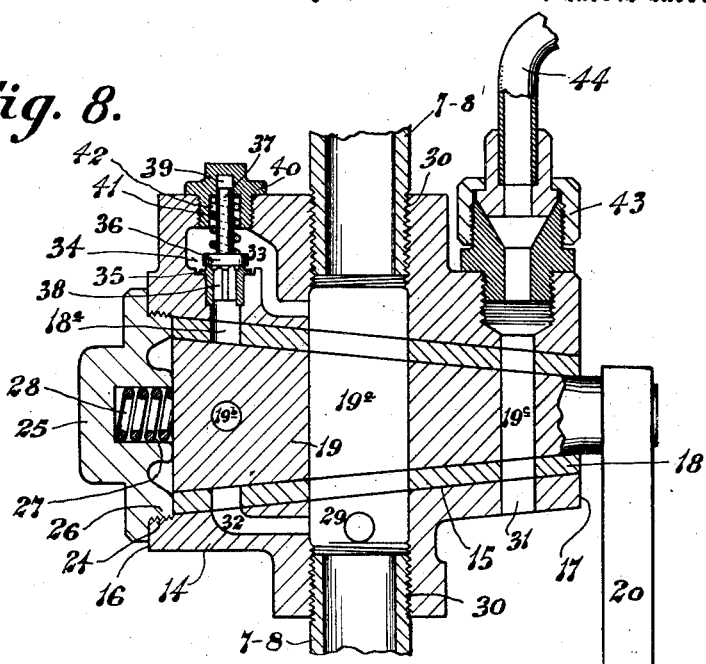
Fig. 8 is an enlarged central vertical section of the non-return check valve partly in elevation and shown in open position, also showing the non-return by-pass and check valve in closed position.

In the embodiment of my invention, as illustrated, and which shows a preferred construction, I provide two usual and well-known automatic-brake-valves 1 and 2 of the rotary type, for illustrative purposes located in cabs 3 and 4 of engines 5 and 6, respectively. Brake-pipes 7 and 8, respectively, are joined to the bottoms of said valves 1 and 2, respectively, by nuts 9 and 10 and lead to main-brake-pipe or train-line 11. Non-return check-valves 12 and 13 are inserted in brake-pipes 7 and 8, respectively, and preferably near said brake-valves 1 and 2. As both of the non-return check-valves 12 and 13 are alike in construction, the description of one will suffice for both. Valve 12—13 comprises body portion 14, which is provided with transverse tapered opening 15 extending from end 16 to end 17 of said body-portion. Tapered tubular bushing 18 is received by said opening 15 and, in turn, receives cylindrical tapered valve-plug 19. Said plug 19 is provided with main passageway 19$^a$, nonreturn by-pass opening 19$^b$ and exhaust opening 19$^c$. Main-passage 19$^a$ and exhaust opening 19$^c$ are disposed at right angles or transversely from by-pass opening 19$^b$. It will, therefore, be seen (Figs. 8 and 9) that when main passage-way 19$^a$ aligns with vertical openings 29 and exhaust passage 19$^c$ aligns with exhaust outlet 31, by-pass opening 19$^b$ will be shut off from passages 32 and 33. Passage 33 leads from hole 18$^a$ in tapered bushing 18 to vertical opening 29 and has non-return by-pass valve 34 inserted therein which comprises brass-bushing and seat 35 inserted in opening 33 and upon which valve 36 seats (as shown in Fig. 8). Valve stem 37 and valve guide 38 are integral with said valve 36. Said valve guide is slidably received within bushing and seat 35 and the upper end of valve stem 37 is slidably received within recess 39 in closure cap 40. Coil spring 41 encircles valve stem 37, one end of which bears against the top of valve 36 and the other end received by socket 42 in said closure cap 40. Coupling 43 connects exhaust pipe 44 with valve 2. The other end of said exhaust pipe is connected by coupling 45 to brake pipe exhaust (not shown) of automatic brake valves 1 and 2. The reduced end of said plug receives manually operated hand lever 20 which is rigidly attached thereto by tapered pin 21 and which has key-way 22 adapted to fit over key 23 integral with said plug 19. The end 16 of tapered opening 15 is provided with internal threads 24. Closure cap 25 has externally threaded shank 26 and centrally located recess 27 which receives coil spring 28. Said cap is screwed into said internally threaded end 16 and maintains a tight fit of tapered tubular bushing 18 within tapered opening 15. Coil spring 28 bears against the large end of cylindrical tapered valve plug 19 for the purpose of maintaining a tight fit between said plug and said tapered tubular bushing 18. Body portion 14 is provided with vertical opening 29 which intersects tapered opening 15 at right angles. The outer ends of said vertical opening 29 are provided with internal threads 30 which receive the threaded ends of brake pipes 7 and 8, respectively.

Figure 9:
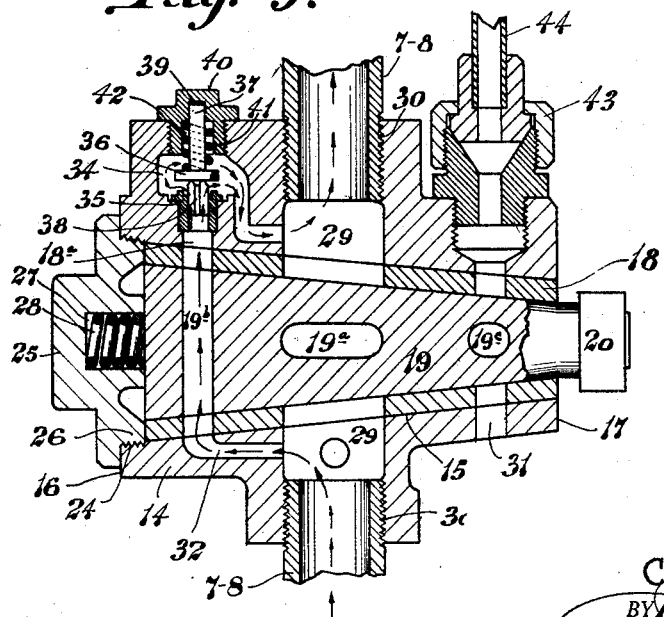
Fig. 9 is a view similar to Fig. 8 but showing the valve in closed position and the non-return by-pass and check valve in opened position.

The operation of my device is as follows:

We will assume that head engine 5, shown in Fig. 1, has handle 1$^a$ of automatic brake-valve 1 set for running position and that opening 19$^a$ of non-return-check-valve 12 is in open position, as shown in Figs. 6 and 8, and that handle 2$^a$ of automatic-brake-valve 2 is in the same position as handle 1$^a$, shown in Fig. 2 and head engine in Fig. 1, and opening 19$^a$ of non-return-check-valve 13 is closed, as shown in Figs. 7 and 9, the man in the head engine, under this condition, would be in full control of the brakes on the head-engine and on the second engine, as well as throughout the entire train. However, should the operative mechanism under the control of the first engine-man become disabled, or should an accident occur which he failed to observe, or should it become necessary, for any reason, to stop the train in case of an emergency which the first engine man failed to observe, the second engine man can set the brakes on the first engine and on the second engine, as well as throughout the entire train by placing the automatic brake valve handle 2$^a$ in the emergency position (as shown in Fig. 3) which will open the train-line to the atmosphere or in other words, reduce the air pressure in the train-line faster than the head engine-man's compressors can supply it into the train-line.

Should the air compressing apparatus of any engine in the train become disabled and cause the compressed air to become exhausted in said engine, the non-return check-valve, if not in closed position should be adjusted to that position whereby the compressed air could be supplied to said engine by any of said other engines by pumping it through the non-return check-valve 12 or 13, as the case may be, of said disabled engine. This would supply such engine with means of power reverse, air sanders, air bell ringer, and supply air for the distributing valve so that such engine could perform all of its usual functions, including the throwing of the brakes into emergency position and none of this could be done without the use of my non-return check-valve.

An advantage of my invention is that in case the brake-pipe connection between the non-return check-valve and the automatic brake-valve is broken on the road, all that is necessary to enable the head engine-man to control the brakes of the train from his engine, with the exception of the disabled engine, is to close valve 13 of the second engine and insert a block of wood, waste, or any article in recess 39 in cap 40, which thereby holds valve-stem 37 and valve 36 on its seat 35, thereby preventing the air from passing through by-pass and discharging through the broken pipe. This arrangement would serve as a temporary expedient until the train is drawn into the terminal.

While I have shown and described a particular construction, it will be apparent that my invention is capable of some modification without departing from the scope or spirit thereof as defined in the claims.

What I claim as new and desire to secure by Letters Patent is:

1. In means of the character described, braking apparatus, an air brake pipe communicating therewith, an automatic brake-valve connected to said brake-pipe, a check-valve interposed in said brake pipe, in combination with a non-return by-pass.

2. In means of the character described, a non-return check valve having a main opening therein, a brake-pipe leading into and from said opening, a tapered valve plug adapted to close and open said main opening and having a hole therein with passage-ways in said valve connecting with said main opening, said hole in said plug being adapted to be turned into and out of alignment with said passage-ways and a non-return by-pass valve inserted in one of said passage-ways.

3. In means of the character described, braking apparatus, a main air brake pipe communicating with said braking apparatus, an automatic brake valve for each engine, a brake pipe communicating from said main brake pipe to each automatic brake valve, and a non-return check valve interposed between each automatic brake-valve and said main brake valve comprising a valve body having a central vertical opening therethrough, the outer ends of which are internally threaded to receive the ends of brake pipe and said body having a horizontal tapered opening intersecting said vertical opening, a tapered bushing in said horizontal opening, a tapered plug in said bushing, a hand lever on the reduced end of said plug and having an opening therethrough adapted to register with said vertical opening and having a reduced opening thereon parallel with said opening and adapted to aline with said vertical reduced openings in said check-valve or be closed therewith, according to the position of said hand lever and said plug having a transversely disposed hole in its large end with passage-ways through said body connecting said hole with said vertical opening and means inserted in said passage-way whereby the flow of air can go in one direction only, substantially as set forth.

4. In means of the character described, a non-return check-valve body having a main opening therein, a brake pipe leading into and from said opening, a valve plug adapted to close and open said main opening, said plug having a hole, said valve body having passage-ways connecting said hole with said main opening, said plug being adapted to be turned to bring said hole into and out of alignment with said passage-ways, and a non-return automatic by-pass valve inserted in one of said passage-ways.

C. RAYMOND WHITACRE.